March 1, 1927.
J. D. MAXWELL
PUMP PACKING
Filed May 13, 1925
1,619,211
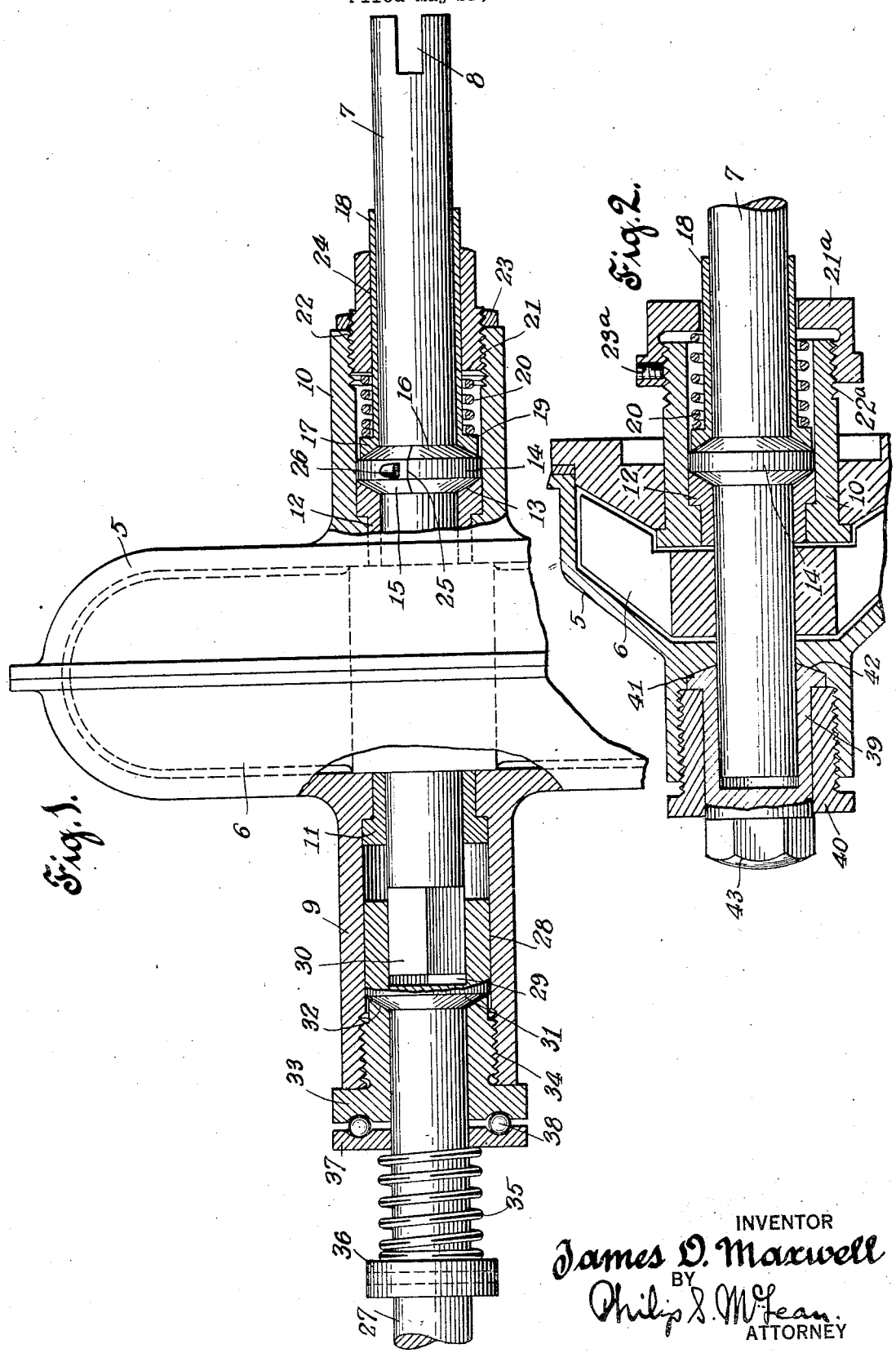
INVENTOR
James D. Maxwell
BY
Philip S. McLean
ATTORNEY Patented Mar. 1, 1927.

1,619,211

UNITED STATES PATENT OFFICE.

JAMES D. MAXWELL, OF BROOKLYN, NEW YORK.

PUMP PACKING.

Application filed May 13, 1925. Serial No. 29,967.

This invention relates particularly to rotary pumps and special objects of the invention are to provide a non-leaking packing for such pumps which will be of simple construction and entirely practical.

It is well known that the ordinary pump packing consisting of an adjustable gland containing a compressible packing material creates considerable shaft friction, wears out and requires frequent adjustment if it is to be kept from leaking.

In this invention these objectionable features are overcome and the above stated objects are attained by providing on the pump shaft, a beveled collar or shoulder yieldingly held in running engagement with a correspondingly shaped seat on the pump casing and therefore acting as a valve to prevent any leakage along the shaft.

The details of such construction and other novel features of the invention are disclosed in the following specification.

The drawing accompanying and forming part of this specification illustrates the invention embodied in a typical commercial form, it being understood that the structure may be modified to suit circumstances, without departure from the broad spirit and scope of the invention.

Figure 1 is a broken sectional view of the packing as employed with a rotary pump of ordinary or usual design.

Figure 2 is a broken section showing an outside nut substituted for the inside spring abutment nut of the right hand shaft packing in Figure 1, and the invention applied to a single side pump.

The pump casing 5 and impeller 6 are not shown in detail as these may be of any usual or special design. The shaft 7 carrying the impeller also may be of any usual or special form and connected by gearing or otherwise with the driving force, it being shown as having a key slot 8 in the outer end thereof for engagement by the corresponding key of a power shaft. The opposite sides of the casing are shown provided with hub extensions 9, 10 carrying the journal bushings 11, 12 for the shaft, the latter being of special design in that it is formed at its outer end with an inset conical seat seat 13.

The shaft is shown as carrying a flange or collar 14 having an inner inclined face 15 engaging the conical seat in the outer end of the bearing bushing and a reversely inclined face 16 engaged by an inset conical seat 17 in the inner end of a thrust sleeve 18. This thrust sleeve has a loose running fit on the shaft and is shown as shouldered at its inner end at 19 for engagement by the surrounding coil spring 20 which bears at its outer end against the nut 21. This nut is shown in Figure 1 as screw threaded into the outer end of the bearing hub at 22 but where the internal dimensions are too small, said nut may be of the external type and screw threaded over the outside of the bearing hub, as shown at 21ᵃ and 22ᵃ in Figure 2. Suitable means for fixing the tension adjusting nut in desired adjustment may be provided as indicated by the lock nut 23 in Figure 1 and the set screw 23ᵃ in Figure 2.

The spring pressed thrust sleeve is preferably clear of the internal diameter of the bearing hub as indicated in both Figures 1 and 2, but it may have a sliding fit in the spring adjusting nut as indicated more particularly at 24 in Figure 1 so as to act as an outboard bearing for the shaft.

In assembling the device the end nut is adjusted to cause the thrust and bearing sleeve to hold the bevel shoulder of the shaft in light running engagement with the conical seat, this tension being sufficient to overcome any outward pressure from within the pump and causing these parts to operate as a free rotating valve, preventing any escape of liquid. Any wear may be taken up by adjusting the tension of the thrust spring but as the thrust is relatively light and the inclined valve faces of appreciable extent, the wear, even after extended use, is very slight.

If desired, the valving thrust collar 14 may be made in segments as I have indicated by the break at 25 in Figure 1, said segments being suitably clamped upon the shaft as by the connecting screws 26. This construction enables application of the invention to standard size shafting and enables the collar being reset after long use to compensate for wear and restore the impeller to its original position within the casing.

Where the pump shaft terminates within the casing it is obvious that packing is only required at one side of the casing as above considered. Where, however, the shafting is extended beyond the pump, as for instance is the practice in certain automobile assemblies where the pump is interposed at an intermediate point in a line of shafting, an additional packing is required where the shaft issues from the other side of the pump casing.

In Figure 1 the extension shafting is indicated at 27 entered in the hub 9 of the pump casing, having a bearing therein at 28 and provided at its inner end with an angular socket 29 slidingly fitting the correspondingly angular end 30 of the pump shaft. This extension shaft is shown formed with an outwardly facing conical shoulder 31 having a free running engagement with a correspondingly inclined seat 32 in the inner end of the combined nut and bearing 33 which is screwed into or onto the end of the bearing hub, as indicated at 34. The bevel shoulder 31 is held in free running valving engagement with the corresponding seat 32 by a spring 35 surrounding the projecting portion of the shaft bearing at one end against a shoulder 36 on the shaft and at the opposite end against a thrust collar 37 shown as supported against the outer end of the bearing nut by an anti-friction or ball bearing 38.

It will be understood that the tension of the spring 35 is fixed to hold the valve shoulder 31 lightly engaged with the seat 32 provided therefor so that while the parts are free to turn, the passage of any liquid from within the pump is effectually prevented.

Figure 2 shows how when the invention is applied to a single side pump, the far end of the pump shaft may be supported in a closed end bearing bushing 39 held to a seat in the bearing hub by a surrounding nut 40 which forces the conical inner end 41 of the bushing into close fitting sealed engagement with a corresponding conical seat 42 at the inner end of the bearing hub. A sealed joint is thus provided for this end of the shaft and upon loosening the securing nut 40 the bushing may be turned by means of the head 43 on the outer end of the same to compensate for wear and provide a new bearing surface.

What is claimed is:

1. The combination with a rotary pump or the like, including a casing having a bearing and a shaft rotating therewith protruding therefrom, of a packing for said shaft comprising a conical shoulder on the shaft, and a conical seat for said shoulder at the end of said bearing forming with the shoulder, a valve, and a spring pressed sleeve surrounding the shaft and exerting presssure to hold said valving parts rotatably engaged, said sleeve having a conical end face and a corresponding conical shoulder on the shaft engaged thereby.

2. The combination with a rotary pump or the like, including a casing having a bearing and a shaft protruding therefrom, of a packing for said shaft comprising a conical shoulder on the shaft, a conical seat for said shoulder at the end of said bearing forming with the shoulder, a valve, and a spring pressed sleeve surrounding the shaft and exerting pressure to hold said valving parts rotatably engaged and an adjusting nut adjustable on the casing for varying the tension of the spring pressed sleeve, said adjusting nut surrounding the sleeve and providing a stationary bearing therefor.

3. A rotary pump comprising a casing having a hub provided with a journal bearing with a conical seat at the outer end of the same, an impeller shaft journaled in said bearing and having an inwardly faced conical shoulder slidingly engaging said seat and a spring pressed sleeve housed in the outer portion of the hub and acting on the shaft to force the conical shoulder thereon inwardly in rotary valving engagement with the conical seat of the bearing.

4. A rotary pump having a hub provided with a journal bearing having a conical seat in the outer end of the same, an impeller shaft journaled in said bearing and provided with an annular flange having conical faces at opposite sides of the same, the inner conical face having a rotary valving engagement with the conical seat, a sleeve surrounding the shaft and having a conical seat engaging the outer conical face of the annular flange, a spring surrounding said sleeve and a stationary nut engaged with the bearing hub and bearing on the outer end of the spring.

5. A rotary pump having a hub provided with a journal bearing having a conical seat in the outer end of the same, an impeller shaft journaled in said bearing and provided with an annular flange having conical faces at opposite sides of the same, the inner conical face having a rotary valving engagement with the conical seat, a sleeve surrounding the shaft and having a conical seat engaging the outer conical face of the annular flange, a spring surrounding said sleeve and a nut engaged with the bearing hub and bearing on the outer end of the spring, said nut having a bore receiving the outer portion of the sleeve to provide an outboard bearing for the shaft.

6. A rotary pump having a hub provided with a journal bearing having a conical seat in the outer end of the same, an impeller shaft journaled in said bearing and provided with an annular flange having conical faces at opposite sides of the same, the inner conical face having a rotary valving engagement with the conical seat, a sleeve surrounding the shaft and having a conical seat engaging the outer conical face of the annular flange, a spring surrounding said sleeve and a nut engaged with the bearing hub and bearing on the outer end of the spring, said valving flange being adjustable upon the shaft to compensate for wear of the valving surfaces.

7. A rotary pump comprising a casing having bearing hubs and shafting projecting from said bearing hubs, conical shoulders on said shafting, conical seats in the bearing hubs for valving engagement by the conical shoulders on the shafting and means for holding said conical shoulders in free running valving engagement with the conical seats, including a spring pressed sleeve exerting endwise thrust on the shaft in one of the bearing hubs, the shaft in the other bearing hub having an endwise extensible coupling, one member of the same carrying the conical shoulder and spring means acting on said member to hold the conical shoulder engaged with the cooperating conical seat of said bearing hub.

8. A rotary pump having a hub provided with a journal bearing having a conical seat in the outer end of the same, an impeller shaft journaled in said bearing and provided with an annular flange having conical faces at opposite sides of the same, the inner conical face having a rotary valving engagement with the conical seat, a sleeve surrounding the shaft and having a conical seat engaging the outer conical face of the annular flange, a spring surrounding said sleeve, a nut engaged with the bearing hub and bearing on the outer end of the spring, a bearing hub projecting from the opposite side of the casing and receiving the shaft, a shaft extension journaled in said bearing hub and having a longitudinally extensible sliding coupling with said projecting portion of the shaft, said shaft extension having a conical shoulder, a conical seat in the outer portion of the bearing hub engaged by said shoulder and spring means acting on the shaft extension to hold the shoulder thereon in free running engagement with the seat provided therefor.

9. A packing for rotary pumps and the like comprising in combination with the rotary pump shaft and a hub provided with a bearing therefor, said bearing having a conical valve face at the outer end of the same, a non-rotating bushing surrounding said shaft, a nut surrounding said shaft bushing and supported by the hub, said bushing having a conical inner end, oppositely facing conical shoulders on the shaft and rotating therewith, one of said shoulders being engaged by the conical inner end of the bushing, the other of said conical shoulders being in rotary valving engagement with the conical valve face in the outer end of the bearing and a spring surrounding the shaft bushing, said spring being acted on by the nut to adjustably hold the bushing yieldingly engaged with the outer shoulder on the shaft and the shaft thereby thrust over with the inner shoulder on the same in free sliding valving engagement with the conical valve face in the outer end of the bearing.

In witness whereof, I have hereunto set my hand this 7th day of May, 1925.

JAMES D. MAXWELL.